UNITED STATES PATENT OFFICE.

JONAS W. AYLSWORTH, OF EAST ORANGE, AND EDWARD L. AIKEN, OF ORANGE, NEW JERSEY, ASSIGNORS TO NEW JERSEY PATENT COMPANY, OF WEST ORANGE, NEW JERSEY, A CORPORATION OF NEW JERSEY.

PROCESS OF FORMING SOUND-RECORDS AND OTHER OBJECTS.

1,170,391. Specification of Letters Patent. Patented Feb. 1, 1916.

No Drawing. Application filed August 6, 1910. Serial No. 575,981.

*To all whom it may concern:*

Be it known that we, JONAS W. AYLSWORTH, a citizen of the United States, and a resident of East Orange, Essex county, New Jersey, and EDWARD L. AIKEN, a citizen of the United States, and a resident of Orange, Essex county, New Jersey, have invented a certain new and useful Process of Forming Sound-Records and other Objects, of which the following is a description.

Our invention relates to a process of forming molded objects, especially flat plates, such as disk sound records, and also as an article of manufacture, to the disk sound record and other molded objects formed by our improved process. The said objects are claimed in a divisional application Serial No. 861,038, filed September 10, 1914.

Our invention, as to certain aspects thereof, is an improvement upon the invention disclosed in application of Jonas W. Aylsworth, Serial No. 543,236, entitled Sound records and process for making the same, filed February 11, 1910.

By our improved process, molded objects are formed of refractory condensation products of phenol or equivalent substances, and formaldehyde or other material containing the methylene radical $CH_2$.

The object of our invention is the production of an efficient, thoroughly practical commercial process of the character described, in which the desired results may be attained quickly, surely, and with the least possible expense.

Our object is also to produce as an article of manufacture various molded objects such as disk sound records, formed by our improved process, and having certain distinguishing characteristics which will hereafter be more fully pointed out.

Our process consists generally in the formation of a body or backing having a large proportion of an inert filling material incorporated therein, the formation of a surfacing layer, having a less proportion of filler or no filler, securing or forming the surfacing layer upon the body, molding the object from the blank thus formed, while at the same time causing the reaction to ensue between the ingredients of the object or of the surface layer thereof by application of sufficient heat to form a final infusible and insoluble condensation product.

In carrying out our process, we prefer to proceed as follows:—A fusible soluble phenolic condensation product or phenol resin is formed. This is preferably the product formed by the reaction of substantially three parts of phenol to two parts of formaldehyde by molecular weights, the reaction apparently taking place according to the equation—

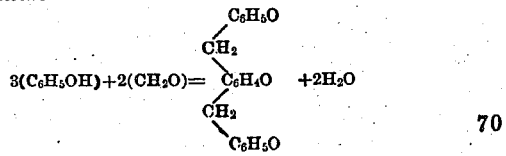

as explained in the said application of Aylsworth, Serial No. 543,236, and also in applications of Aylsworth, Serial No. 496,060, filed May 14, 1909, entitled Plastic composition and process of manufacturing the same, and Serial No. 543,238, filed February 11, 1910, entitled Phenolic condensation product and method of preparing the same. Whether or not the reaction takes place according to the equation given, the resulting condensation product is fusible and soluble in alcohol and other solvents and is a solid at normal temperatures. Apparently, this product contains no free formaldehyde or other free or active methylene-containing substance, and it is permanently fusible in the sense that it cannot be transformed into an infusible final condensation product by any amuont of heating with or without pressure without the addition of formaldehyde, paraformaldehyde, hexa-methylene-tetraamin, or other hardening agent, but upon being heated together with a sufficient quantity, as 10%, of such hardening agent, a transformation takes place changing the phenol resin into a final infusible insoluble condensation product, as is explained in the applications of Aylsworth above referred to. To make the blank or body of a disk sound record or other object to be molded, we prefer to dissolve the fusible condensation product or phenol resin obtained as above described in a liquid solvent for the same, preferably alcohol. A sufficient percentage of a methylene-containing or hardening agent is then dissolved in the solvent containing the phenol resin. We prefer to make use of hexa-methylene-tetra-amin in the proportion of about 10 per cent. of the phenol resin, and this is preferably first dissolved in a sufficient amount of water and added to the solution of the phenol resin in the alcohol, since the hexa-methylene-tetraamin dissolves more readily in water than in alcohol. Next, an inert filling body such as dry wood pulp or other filling materials, such as are described in the applications of Aylsworth above referred to, are placed in a mixing machine, and if desired, a coloring material, such as lamp black, is added to the mixture. The solution of the phenol resin and the hardening agent is then poured into the mixing machine upon the filler and the components are thoroughly mixed together. The solvent is then removed as by evaporation, the alcohol preferably being recovered and used over and over. The dried mixture resulting is then ground to uniformity and molded preferably in a hydraulic press with a suitable amount of heat, preferably about 300 degrees F., steam heat, the blank or body thus being formed. In this molding operation, the hardening reaction between the phenol resin and the hexa-methylene-tetraamin may take place to a limited extent, although it is only necessary that the materials be sufficiently heated to coalesce in the mold to form the blank. The filling body may be used with good results in the proportion of two or three to one by weight to the phenol resin.

The surface layer for the object to be molded is preferably formed as follows:—A sufficient amount of phenol resin, together with a hardening material, preferably hexamethylene-tetra-amin, a plasticity agent, such as described in the applications of Aylsworth above referred to, and which is preferably chlorinated naphthalene, as mono-chloro-naphthalene, are ground together, with a percentage of an inert filler less than the percentage used in the case of the mixture for the blank above described. Preferably, a percentage of the blank mixture itself is used for incorporation with the other ingredients to provide the filling body. We have obtained good results with the following proportions:

Phenol resin _____ 100 parts.
Blank mixture_____ 10 to 40 parts.
Mono-chloro-naphthalene___ 15 to 30 parts.
Hexa-methylene-tetra-amin_ 10 to 12 parts.

Preferably, the hexa-methylene-tetra-amin in perfectly dry condition is first ground through a paint mill together with the chlorinated naphthalene, which is rendered liquid if necessary by heat. This operation results in the formation of a paste. The phenol resin is then ground and the desired amount of the blank mixture stirred into the same after the grinding, together with the paste containing the hexa-methylene-tetraamin and the chlorinated naphthalene. A damp powder results. The mixture thus formed is preferably now subjected to a more uniform mixing operation by running the same between heated mixing rolls. The mixture is then preferably formed into sheets by passing the same through heated calender rolls, the heat of the rolls being sufficient to cause the formation of the sheet, but not to cause the reaction between the ingredients. The surface layer in the form of sheets is then fixed to the blank in any suitable manner. In the case of a plate to be molded, such as a disk sound record, the heated blank together with a surfacing sheet is passed between warm rolls. In the case of a disk sound record which it is desired to mold upon both sides, a surface layer is secured to each side of the blank by passing the heated blank with surfacing sheets on both sides of the same through the rolls. The blank is now ready to be molded and is placed in a suitable mold, heated sufficiently, and pressed preferably in a hydraulic press, the reaction ensuing between the ingredients of the composition while in the press to harden the molded object into a final infusible and insoluble product, such as is described in application of Aylsworth, Serial No. 543,236, above referred to, the body and the surface layer being one homogeneous mass. Upon cooling, the finished molded object may be removed from the mold.

We prefer to use hexa-methylene-tetraamin as a hardening agent for reasons given in applications of Aylsworth, Serial No. 543,236 and 543,238, although para-formaldehyde or other methylene-containing substances may be used. During the final reaction, there is no evolution of dissociation gases, and counteracting pressure, accordingly, need not be used to prevent gassing in the composition, pressure being used only for the purpose of giving the object the desired form. In the case of various objects, it will not be necessary to perform the entire reaction within the mold during the shaping of the object, which may be transformed into its final infusible and insoluble form subsequently. In the case of various molded objects having exceedingly delicate surfaces, particularly sound records, the best result is attained by performing the final hardening reaction while the object is being pressed in the mold. The filling body used may be a final infusible phenolic hard condensation product ground fine and mixed with the other ingredients, in place of wood pulp or other organic or inorganic fillers. This is mentioned in applications of Aylsworth, Serial No. 543,236, above referred to, and Serial No. 575,970, filed Aug. 6, 1910.

It is obvious that our invention is not limited to the particular details described, but that the latter may be modified within the scope of the appended claims without departing from the spirit of the invention. The body of the record or other object formed should upon molding make a homogeneous mass with the surface layer, to obtain the best results, but for some purposes the body may be formed of an inert filler and a binder other than a phenolic condensation product, particularly if the body is of material having substantially the same coefficient of expansion as the surface layer which in such case is in the nature of a veneer applied to the backing.

Having now described our invention, what we claim and desire to protect by Letters Patent is as follows:

1. The process of forming molded objects which consists in dissolving a permanently fusible phenolic condensation product in a liquid solvent therefor, mixing therewith an inert filling material, freeing the mass of the solvent, reducing the same to uniform powder, heating the same and molding the same to shape, substantially as described.

2. The process of forming molded objects which consists in dissolving a permanently fusible phenolic condensation product in a liquid solvent therefor, mixing therewith an inert filling material, freeing the mass of the solvent, heating the same and molding the same to shape, substantially as described.

3. The process of forming sound record blanks, which consists in dissolving a permanently fusible phenolic condensation product in a liquid solvent therefor, dissolving therein a sufficient quantity of a methylene containing substance to harden the mass upon subsequent bringing of the same to the reaction temperature, mixing therewith an inert filling material, freeing the mass of the solvent, reducing the same to a uniform powder, heating the same, and molding the same to shape, substantially as described.

4. The process of forming molded objects, which consists in making a blank comprising a phenolic condensation product, forming a surface layer comprising a mixture of a permanently fusible phenolic condensation product, and a methylene containing substance in sufficient quantity to harden the mass to an infusible product upon heat treatment, then applying the same to the surface of the blank, and then applying the object thus made to a suitable mold and molding the same with application of heat, substantially as described.

5. The process of forming molded objects, which consists in making a blank comprising an inert filling body and a binding agent, forming a surface layer comprising a mixture of a permanently fusible phenolic condensation product and a methylene containing substance in sufficient quantity to harden the mass to an infusible product upon heat treatment, then applying the same to the surface of the blank, and then applying the object thus made to a suitable mold and molding the same with application of heat, substantially as described.

6. The process of forming molded objects, which consists in mixing together a permanently fusible phenolic condensation product, an inert filler, and a hardening agent, consolidating the ingredients to form a blank, forming a surface layer comprising a mixture of permanently fusible phenolic condensation product and a hardening agent, applying the same to the surface of the blank, and then pressing the object thus formed in a suitable matrix with application of heat sufficient to cause the ingredients to react and harden, substantially as described.

7. The process of forming molded objects, which consists in mixing together a permanently fusible phenolic condensation product, an inert filler, and a methylene-containing substance in sufficient quantity to harden the mass to an infusible product upon subsequent heat treatment, forming a blank thereof, forming a surface layer comprising a mixture of permanently fusible phenolic condensation product and a hardening agent, applying the same to the surface of the blank, and then pressing the object thus formed in a suitable matrix with application of heat sufficient to cause the ingredients to react and harden, substantially as described.

8. The process of forming molded objects, which consists in making a blank comprising a phenolic condensation product, forming a surface layer comprising a mixture of a permanently fusible phenolic condensation product, and a methylene-containing substance in sufficient quantity to harden the mass to an infusible product upon subsequent heat treatment, applying the same to the surface of the blank, and then pressing the object thus formed in a suitable mold with application of heat sufficient to cause the ingredients of the surface layer to react and harden, substantially as described.

9. The process of forming molded objects, which consists in making a blank comprising a phenolic condensation product, forming a surface layer comprising a mixture of a permanently fusible phenolic condensation product and a methylene-containing substance in sufficient quantity to harden the mass to an infusible product upon subsequent heat treatment, applying the same to the surface of the blank, and heating the object thus formed sufficiently to cause the ingredients of the surface layer to react and harden, substantially as described.

10. The process of forming molded objects, which consists in making a blank comprising an inert filling body and a binding agent, forming a surface layer comprising a mixture of a permanently fusible phenolic condensation product and a methylene-containing substance in sufficient quantity to harden the mass to an infusible product upon subsequent heat treatment, then applying the same to the surface of the blank, and then pressing the object thus formed in a suitable mold with application of heat sufficient to cause the ingredients of the surface layer to react and harden, substantially as described.

11. The process of forming molded objects, which consists in making a blank comprising an inert filling body and a binding agent, forming a surface layer comprising a mixture of a permanently fusible phenolic condensation product and a methylene-containing substance in sufficient quantity to harden the mass to an infusible product upon subsequent heat treatment, applying the same to the surface of the blank, and heating the object thus formed sufficiently to cause the ingredients of the surface layer to react and harden, substantially as described.

12. The process of forming molded objects, which consists in making a blank comprising an inert filling body and a binding agent, forming a surface layer comprising a mixture of a permanently fusible phenolic condensation product and a methylene-containing substance in sufficient quantity to harden and render infusible the mass upon subsequent heat treatment together with a plasticity agent, applying the same to the surface of the blank, and heating the object thus formed sufficiently to cause the ingredients of the surface layer to react and harden, substantially as described.

13. The process of forming molded objects, which consists in making a blank comprising an inert filling body and a binding agent, forming a surface layer comprising a mixture of a permanently fusible phenolic condensation product and a methylene-containing substance in sufficient quantity to harden and render infusible the mass upon subsequent heat treatment together with a plasticity agent, and a quantity of an inert filling body in less proportion than is used in the blank, then applying the same to the surface of the blank, and then pressing the object thus formed in a suitable mold with application of heat sufficient to cause the ingredients of the surface layer to react and harden, substantially as described.

14. The process of forming molded objects, which consists in making a blank comprising an inert filling body and a binding agent, forming a surface layer comprising a mixture of a fusible phenolic condensation product, sufficient hexa-methylene-amin to harden and render infusible the mass upon subsequent heat treatment, together with chlorinated naphthalene in the proportion of 10% to 40% of the weight of the said fusible product, applying the same to the surface of the blank, and heating the blank thus formed sufficiently to cause the ingredients of the surface layer to react and harden, substantially as described.

15. The process of forming molded objects, which consists in making a blank comprising an inert filling body and a binding agent, forming a surface layer comprising a mixture of a permanently fusible phenolic condensation product and a methylene-containing substance in sufficient quantity to harden and render infusible the mass upon subsequent heat treatment together with a plasticity agent, and a quantity of the composition of said blank in the proportion of less than half of the amount of said fusible product, by weight, then applying the same to the surface of the blank, and then pressing the blank thus formed in a suitable mold with application of heat sufficient to cause the ingredients of the surface layer to react and harden, substantially as described.

16. The process of forming molded objects, which consists in making a blank comprising an inert filling body, a permanently fusible phenolic condensation product, and a methyleneating agent therefor, forming a surface layer thereon comprising a mixture of the said blank mixture with a greater quantity of the fusible phenolic condensation product, a methyleneating agent and a plasticity agent, and heating sufficiently to cause the ingredients to react and the object be transformed into hard infusible product, substantially as described.

17. The process of forming molded objects, consisting in molding a blank comprising an inert filling body and a binding agent, forming a surface layer thereon comprising a permanently fusible phenolic condensation product and a methylene-containing substance and pressing in a mold while applying heat sufficient to cause the ingredients of the surface to react and form a hard infusible product, substantially as described.

18. The process of forming molded objects consisting in molding a blank comprising an inert filling body and a binding agent, forming a surface layer thereon comprising a permanently fusible phenolic condensation product and a methylene-containing substance and a plasticity agent, and pressing in a mold while applying heat sufficient to cause the ingredients of the surface to react and form a hard fusible product, substantially as described.

19. The process of forming flat plates consisting in forming a surfacing material comprising a fusible phenolic condensation product and a methylene containing substance, applying the same to a backing plate by passing the plate and a sufficient quantity of the material through hot rolls, and heating the plate thus formed sufficiently to cause the ingredients of the surface to react to form a hard infusible product, substantially as described.

20. The process of forming flat plates, consisting in forming a surfacing material comprising a fusible phenolic condensation product and a methylene-containing substance, forming a thin sheet of the same, and applying to a backing plate by passing the plate and sheet together through heated rolls, substantially as described.

21. The process of forming molded objects, which consists in making a blank comprising an inert filling body and a binding agent, forming a surface layer comprising a mixture of a permanently fusible phenolic condensation product, a methylene containing substance in sufficient quantity to harden the mass to an infusible product upon heat treatment, and a plasticity agent, applying the surface layer to the surface of the blank, and then molding the blank with application of heat in a suitable matrix, substantially as described.

22. The process of forming molded objects which consists in dissolving a permanently fusible phenolic condensation product in a liquid solvent therefor, mixing wood pulp therewith, freeing the mass of the solvent, reducing the same to uniform powder, heating the same, and molding the same to shape, substantially as described.

23. The process of forming molded objects which consists in dissolving a permanently fusible phenolic condensation product in a liquid solvent therefor, mixing wood pulp therewith, freeing the mass of the solvent, heating the same, and molding the same to shape, substantially as described.

24. The process of forming sound record blanks, which consists in dissolving a permanently fusible phenolic condensation product in a liquid solvent therefor, dissolving therein a sufficient quantity of a methylene containing substance to harden the mass upon subsequent bringing of the same to the reaction temperature, mixing wood pulp therewith, freeing the mass of the solvent, reducing the same to a uniform powder, heating the same, and molding the same to shape, substantially as described.

25. The process of forming molded objects, which consists in mixing together a permanently fusible phenolic condensation product and an agent capable of reacting chemically with said condensation product to form an infusible phenolic condensation product, consolidating the said ingredients to form a blank, applying to the blank thus formed a thermo-plastic surface layer, and transforming said blank with application of heat into said infusible product, substantially as described.

This specification signed and witnessed this 30th day of July, 1910.

JONAS W. AYLSWORTH.

Witnesses:
 DYER SMITH,
 DELOS HOLDEN.

EDWARD L. AIKEN.

Witnesses:
 DYER SMITH,
 FRANK D. LEWIS.